INVENTOR
Rudolph Birmann

INVENTOR
Rudolph Birmann
BY
ATTORNEYS.

Patented May 19, 1942

2,283,176

UNITED STATES PATENT OFFICE 2,283,176

ELASTIC FLUID MECHANISM

Rudolph Birmann, Newton, Pa., assignor to Turbo Engineering Corporation, New York, N. Y., a corporation of Delaware Application November 29, 1937, Serial No. 176,979

18 Claims. (Cl. 60—49)

This invention relates to rotary mechanisms for the handling of elastic fluids, for example, elastic fluid impellers and turbines.

In my Patents 1,926,225, dated September 12, 1933, and 1,959,703, dated May 22, 1934, I have disclosed among other features a special design of turbine permitting operation by means of driving gases, particularly products of combustion, of such high temperature that unless the turbine wheel was cooled it would be almost immediately destroyed. The inventions of said patents have particular utility in the supercharging of internal combustion engines using as the motive power for the supercharger the energy of the products of combustion from the engine to be supercharged. Inasmuch as the supercharger must deliver compressed air to the engine, an impeller was so combined with the turbine in a unitary structure that the air being compressed served for the cooling of the rotor, thus holding the temperature of the rotor within safe limits. There is a disadvantage to such an arrangement from two standpoints. First, a centrifugal compressor acts more efficiently as the temperature of the gas being compressed is maintained lower. Secondly, gases delivered from my prior arrangement are heated to such an extent that for many applications cooling is required even though the temperature increase due to the compression alone would not make cooling necessary, this being effected by means of a cooler located at the compressor outlet. Such cooling represents, of course, a further waste of energy, but may be necessary, for example in supercharging, to avoid a preignition of the explosive mixture.

Furthermore, there are many applications of turbines driven by gases at high temperatures which involve taking mechanical energy from the turbine, for example, by having it drive a generator or furnish the power to drive a propeller. In such case, the air used for cooling in my prior arrangements would be compressed and thus the energy imparted to it in the form of heat and pressure would be lost.

One object of the present invention is the provision of a cooling arrangement for a turbine operated by high temperature gases in which cooling air or other gas is caused to flow over surfaces of the turbine rotor formed either by separate passages in the rotor or, at last in part, by the turbine buckets, but in which the cooling air is so handled that while it effects cooling by absorption of considerable amounts of heat and, at the same time, is compressed, the energy imparted to it in this fashion is in large measure recovered in the form of mechanical energy imparted by it to the turbine rotor. Alternatively, my invention also contemplates the recovery of this energy in the form of high pressure of the cooling gas by the partial conversion of the heat energy imparted to it in the cooling process into pressure energy at reasonably low temperatures.

In other words, broadly speaking, my present invention accomplishes the recovery of a very considerable portion of energy which would be wasted as a result of the necessary cooling of a high temperature turbine.

In accordance with the present invention, when a high temperature turbine of the type heretofore indicated is used for supercharging purposes, it is preferably designed to accomplish compression of air in an impeller structure of one or more stages substantially heat insulated from the turbine structure so that the impeller may be caused to operate efficiently. For cooling purposes, some of the air may be taken from the compressor and the energy imparted to it in the cooling process either transformed into mechanical energy or into pressure energy so that it may be returned to the stream of air supplied by the compressor. The cooling air in such case need not be supplied from the compressor, though that is generally desirable because for efficient cooling in passages of the short lengths imposed by mechanical considerations, a compressed cooling gas is more effective than a cooling gas at relatively low pressure.

In my said patents, I have described a novel type of blading which lends itself for application to centrifugal compressors and to turbines. As a matter of fact, with suitable relative design the same vane surface as described by the expression referred to in my patents may be used for both the formation of the turbine buckets and cooling passages of an associated construction of the type mentioned. As a consequence it is possible to provide a very compact rotor construction having the most direct heat conductive relationship between the turbine buckets and the cooling passages. In fact, as described hereafter, because of the possibility of use of the same blade surfaces for the expansions of heated cooling air and of the driving gases, the turbine buckets may form part of the cooling gas passages, such a construction involving the introduction of driving gases over a certain peripheral portion of the rotor housing and the introduction of cooling gases over the remainder, or even a simultaneous use of a portion of the same passages for both the driving and cooling gases.

The same principles of recovery of heat and pressure energy from the cooling gases for a turbine are applicable in accordance with a broader aspect of the invention for the provision of both efficient compressors of multiple stage type and of turbines adapted to receive their energy in whole or in part from the direct application of heat to gases flowing through rotor passages, the heat so applied being particularly waste heat of, for example, hot gases at atmospheric pressure exhausted from a turbine. The accomplishment of such objects will be best understood from the following description.

Another feature of the invention resides in the provision of more efficient turbines by the utilization of the type of passage surface described in my prior patents by taking advantage of the possibility of directing driving gases relative to such a surface so as to secure within practical limits very considerable variations of inlet angle, while nevertheless, maintaining impactless entrance of the gases, in such fashion that the most effective spouting velocity of the supply nozzles and the most desirable peripheral speed of the turbine rotor may be successfully correlated despite considerable divergence of their relative values. In such fashion, efficient operation may be obtained whether the spouting velocity greatly exceeds the peripheral velocity at the entrance to the turbine buckets or whether the latter greatly exceeds the former. By the adoption of this feature of the invention considerably greater freedom of design is made possible and particularly the obtaining of the optimum mechanical construction.

In order to make clear the principles and objects of my invention, there will first be described certain mechanical constructions in which various aspects of the invention are embodied, and thereafter the underlying principles and their broader application, this description being clarified by the accompanying drawings, in which.

Figure 1:
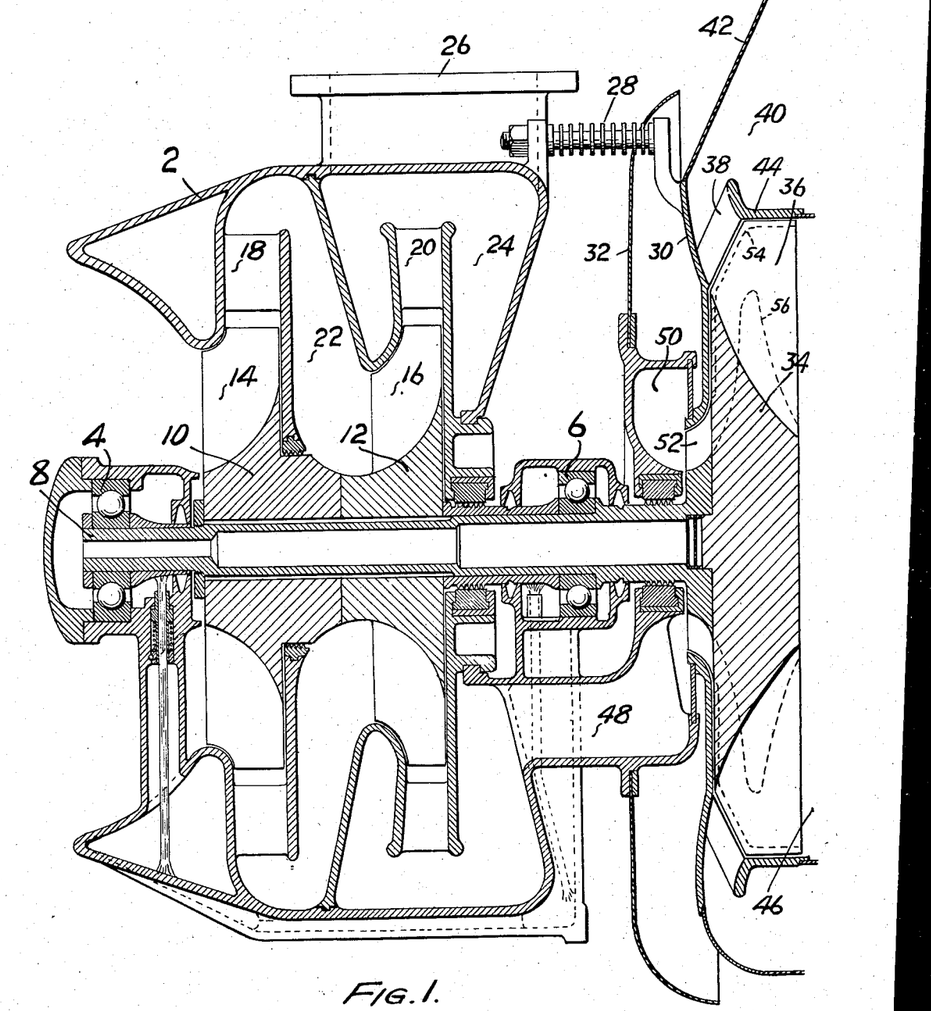
Figure 1 is a vertical section through a combination turbine and compressor arranged in accordance with the principles outlined above and designed particularly for the supercharging of an engine, the exhaust gases of which serve to drive the turbine.

Referring first to Figure 1, there is illustrated therein in substantial mechanical detail a combination turbine and compressor embodying the principles of the invention. Specifically, in this modification there is provided a turbine driven by products of combustion and driving a two-stage compressor. The major portion of the output of this compressor is to be turned to useful purpose, for example, for supercharging the engine the products of combustion of which are used to drive the turbine. Some of the air from the compressor, however, is used to cool in an efficient manner the rotor of the turbine by being passed through suitable passages in the blades thereof.

The compressor casing is indicated at 2 and is arranged to support in suitable bearings 4 and 6 the shaft 8 which carries the compressor wheels 10 and 12. These rotors are provided with vanes 14 and 16, respectively, both associated with diffuser passages 18 and 20 and joined by a passage indicated at 22, so that air subjected to the two stages of compression is delivered to the discharge volute 24 from which the major portion may flow through the exit 26 to the point of use.

Carried by the compressor casing and secured thereto by members such as indicated at 28 to prevent substantial transmission of heat is the turbine casing indicated at 30. Shielding means 32 is preferably provided to prevent substantial transmission by radiation of heat from the turbine to the compressor.

The turbine rotor 34 is carried by the end of the shaft 8 and is provided with vanes 36 defining bucket passages for the driving gases which enter the passages through nozzles 38 from a gas chest indicated at 40, and bounded by an outer wall 42 and the wall 44, which separates it from the discharge passage 46.

Part of the compressed air passes through a conduit 48 into the annular passage 50 whence it flows through passages 52 formed in the end of the shaft 8 which constitutes part of the rotor, and then into passages through the turbine vanes bounded as indicated at 54 and 56, and of a form referred to in greater detail hereafter.

Figure 1, as thus described, is illustrative of the mechanical relationships of the various parts of an apparatus embodying the improvements. While the major features of the improvements lie in the provision of properly designed cooling and driving gas passages, as will be brought out hereafter, it should be noted that in an arrangement such as that illustrated in Figure 1, designed to operate at extremely high speeds, the various mechanical features and the arrangement must be such as to be consistent with the obtaining of maximum efficiency. The principles of bearing design for high speed rotors are, of course, well known. Proper lubrication must be provided and suitable arrangement made for reducing leakage to as great an extent as possible consistent with freedom of rotation at the high speeds which are used. Inasmuch as a compressor should operate at as low temperatures as possible, effective insulation must be provided between the compressor portion of the apparatus and the turbine portion. This may be best accomplished by the provision of suitable shielding with a minimum of metallic connection, as indicated.

Figure 2:
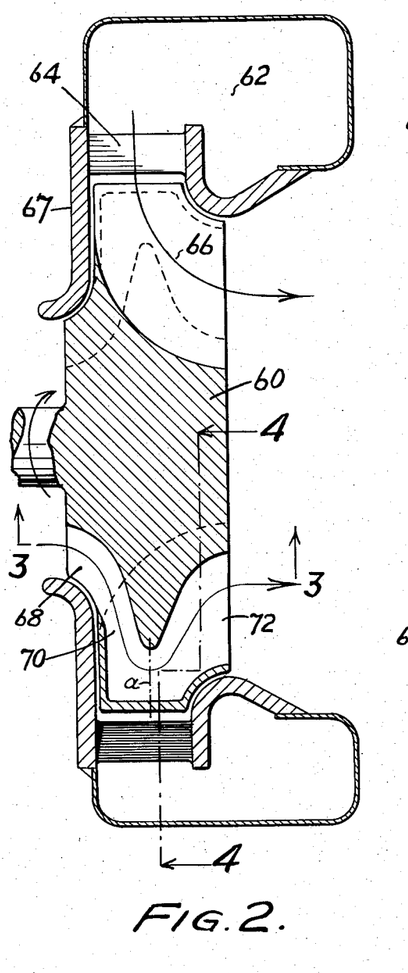
Figure 2 is a vertical section of a somewhat similar turbine arrangement per se indicating more clearly the relationships of the driving gas and cooling gas passages.
Figure 3:
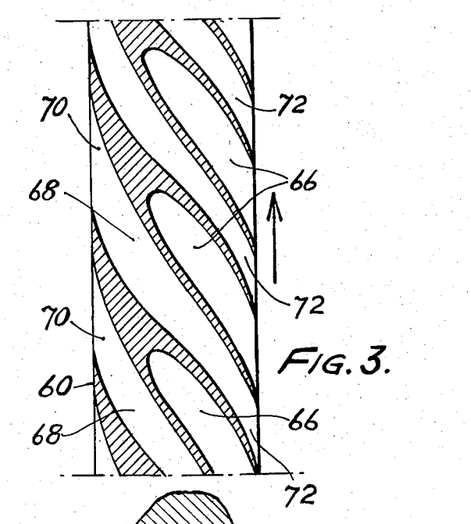
Figure 3 is a developed section taken on the surface the trace of which is indicated at 3—3 in Figure 2.
Figure 4:
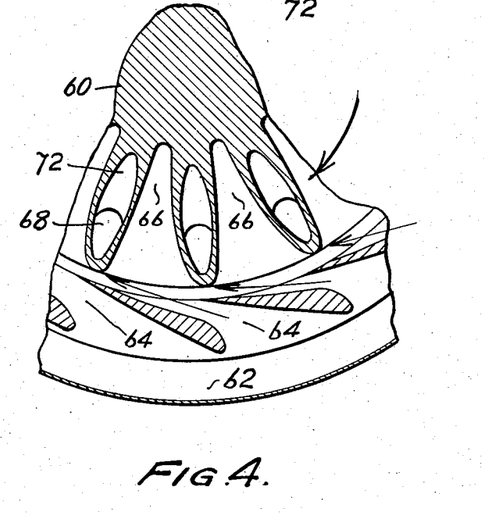
Figure 4 is a substantially axial section taken on the broken plane the trace of which is indicated at 4—4 in Figure 2.

In Figures 2, 3 and 4 there is illustrated in greater detail and in connection with a somewhat different turbine the type of arrangement for cooling the turbine illustrated in Figure 1. In these figures there is shown a turbine rotor 60 which, as in the modification of Figure 1, is associated with a driving gas chest 62 from which gas is supplied through nozzle passages 64 to turbine buckets indicated at 66. It will be noted that in this case the turbine bucket passages are not entirely bounded on their inner surfaces by rotary walls, but are bounded in part by a portion of the housing indicated at 67. In this way the material of the rotor may be substantially reduced, while maintaining the desired direction of entrance of the driving gas.

The cooling gas passage is indicated as a whole at 68 and comprises the impeller portion indicated at 70 and the expansion nozzle portion indicated at 72. The design of this passage will be described in greater detail hereafter. For the present it is sufficient to point out that in the portion 70 of the passage the cooling air or other gas is subjected to an impeller action with attendant increase in its absolute velocity and pressure while heat is absorbed from the turbine disc. After passing to a point adjacent the periphery of the disc the passage extends inwardly and expands in suitable fashion to provide the effect of a reaction turbine, the kinetic and heat energy of the air being now transformed into mechanical energy to aid in the driving of the rotor. In this way a considerable portion of energy which would be otherwise lost is retrieved while at the same time there is obtained the cooling effect of the air to prevent failure of the metal of the rotor.

Reference to Figures 3 and 4 will give a qualitative idea of the relationships of the turbine buckets and the cooling gas passages. These are preferably designed on the basis of my improved type of surface, hereafter described. For mechanical reasons, and because of the necessity for providing boundaries, various curvatures and bounding walls for the passages must be provided, but, in general, it may be said that the passages and radial bounding walls are constructed on the basis of my improved design illustrated and described in greater detail hereafter.

In Figures 5 to 8, inclusive, there is illustrated an arrangement in which a single stage compressor is driven by a turbine operating on products of combustion, but in which the cooling air is not compressed prior to its entrance in the cooling passages for the turbine vanes. The casing in this arrangement is illustrated at 74 and supports in suitable bearings 78 and 80 a shaft 76 which carries a compressor disc 82 to which in turn is secured the turbine disc 84. The compressor disc 82 carries vanes defining passages 86 arranged to discharge air into diffuser passages 88 defined by blades and thence into the discharge volute 90 from which the air may flow to the point of use, for example, to supply supercharging air for the internal combustion engine providing the exhaust gases which drive the turbine. The air is supplied to the compressor vanes 86 through passages 92 which surround and thus provide cooling for the shaft bearings. Additionally, passages such as 94 through the diffusing vanes may be provided through which air flows from between the compressor and turbine housings and thus prevents undue heating of the former by the latter. This air cools the diffuser obviating the necessity for a separate cooler at the discharge and increasing the diffuser efficiency by causing the compression in it to approximate isothermal conditions.

Figure 5:
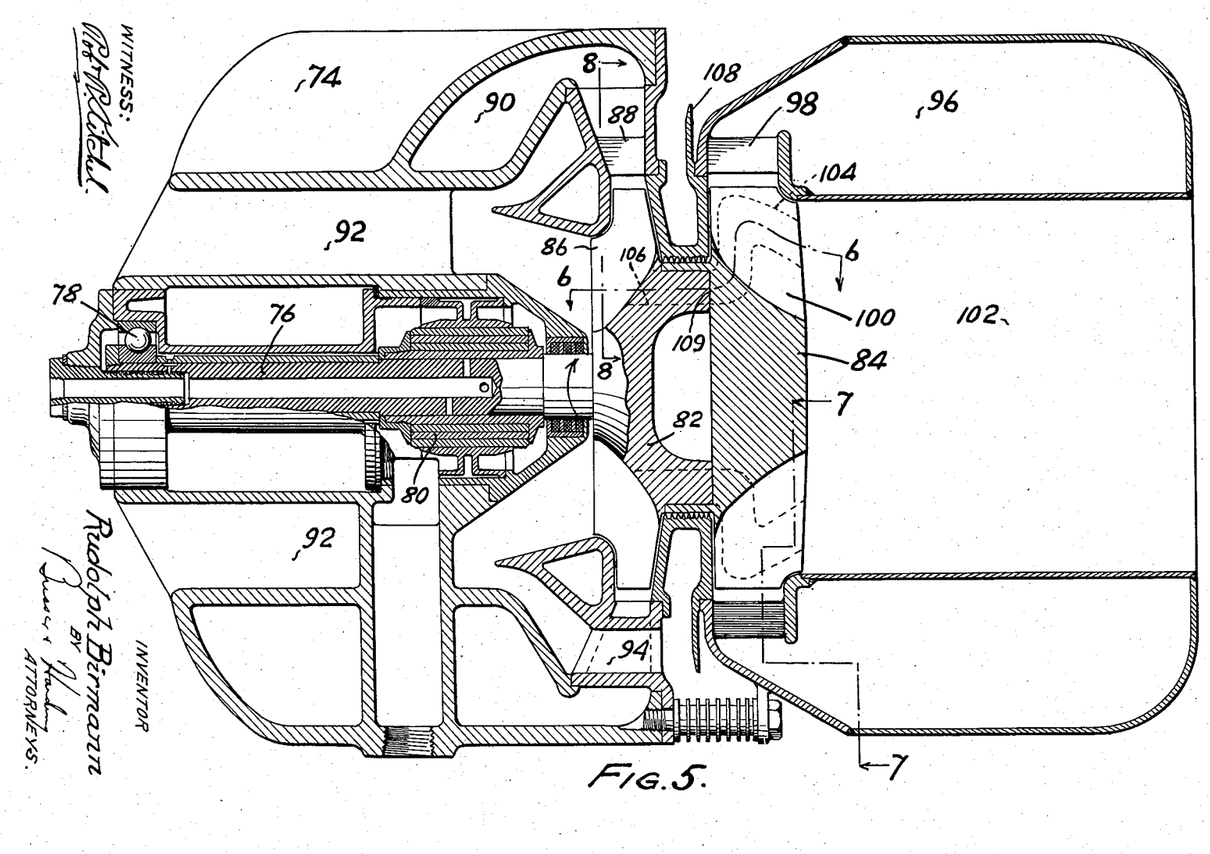
Figure 5 is a view somewhat similar to Figure 1, but illustrating a more direct association of impeller with a driving turbine and indicating the use of a portion of the impeller passages for supplying cooling gas to the turbine.

The turbine is supplied with gases from the chest 96. Nozzle passages indicated at 98 provide the high velocity of flow of the gases entering the bucket passages 100. Discharge takes place into the central conduit indicated at 102.

The arrangement of Figure 5 differs from the arrangement of Figure 1 in that the air for cooling purposes is taken through the inlet portions of the compressor without, however, being substantially compressed thereby. The cooling air passages are indicated at 106 and their construction will be clear from a consideration of the sectional views of Figures 6, 7, and 8. As in the previous modification, the proper expansion takes place in the discharge portions 104 of these passages to secure efficient operation by retrieving as mechanical energy as much as possible of the heat energy transferred from the rotor.

Again, it is desirable that the transfer of heat from the turbine to the compressor be minimized and to this end the minimum connection between the turbine and compressor discs is provided, it being noted that the central portion of the compressor disc is cut away adjacent the turbine disc for this purpose. Additionally, separation of the turbine and compressor housings is effected as far as possible, a shield 108 being provided over which may flow the air entering the passages 94 so that this air will not effect cooling of the high temperature driving gases in the nozzles and gas chest.

Figure 6:
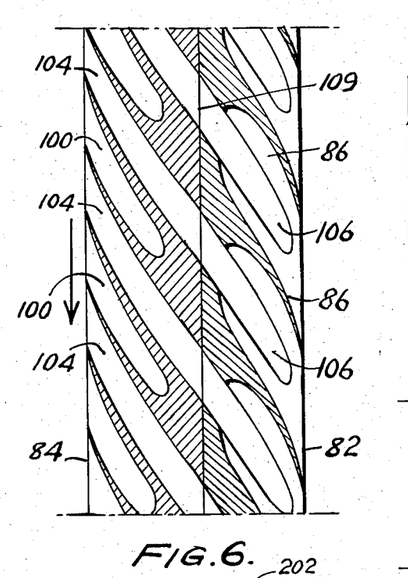
Figure 6 is a developed section taken on the surface indicated at 6—6 in Figure 5 and particularly indicating the mode of combination of a plurality of my improved surfaces for securing desirable inlet and outlet conditions when a single surface would not lead quite so effectively to the attainment of the same result.
Figure 7:
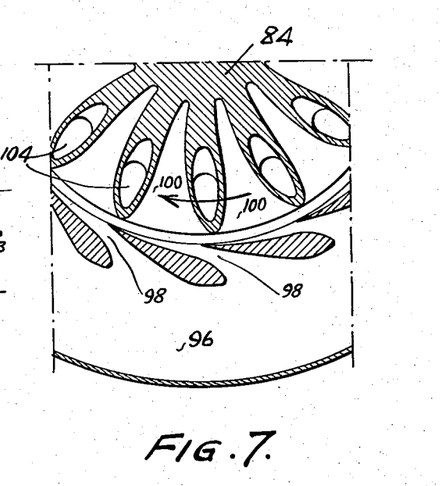
Figure 7 is a section taken on the broken plane surface the trace of which is indicated at 7—7 in Figure 5.
Figure 8:
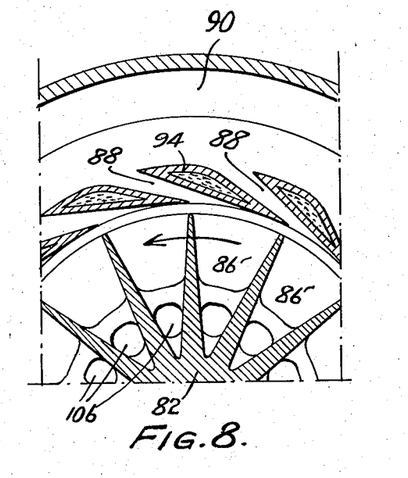
Figure 8 is a section taken on the plane the trace of which is indicated at 8—8 in Figure 5.

Figures 6, 7 and 8 will aid in visualizing the relationships of the turbine, impeller and cooling passages, though it will be understood that these figures are illustrative only. As in the arrangements already described, the passages are based on my improved type of passage surface heretofore referred to, modified to the extent of suitably streamlined entrances and rounded inner and outer boundaries. In Figure 6 there is illustrated a possibility of design with my improved type surface which lends itself to the meeting of unusual conditions which may sometimes be imposed. Whenever possible, it is desirable in constructions of the type herein described to base the passages for all gases which are being handled in a unit rotor construction on the same theoretical surface. In other words, if possible in the case of this modification, the passages 86, 106, 100 and 104 should all be based on the same theoretical surface. In this way, the smoothest passage for all of the gases may be secured and the maximum mechanical strength will also be obtained because of the uniformity of the walls between the passages resulting therefrom. Manufacture is also facilitated.

However, given certain mechanical limitations of, say, the axial length of a rotor or its maximum diameter or the like, and given also some other factors such as the optimum spouting velocity of the turbine driving gases and the volume and pressure of air to be compressed or the like, it may not be feasible to adhere to the same surface as the basis for the design of all the passages. Consequently, there may be adopted what is illustrated in Figure 6. In this case, the impeller passages 86 and the inlet portions of the cooling gas passages 106 are based on one surface while the bucket passages 100 and the outer portions of the cooling gas passages 104 are based on another surface. Under such circumstances a two-part rotor is generally indicated, the two portions being joined along the surface indicated at 109. This separate construction, it will be noted is also desirable in the present instance since it serves to minimize heat conduction from the turbine rotor to the compressor rotor as far as possible by making it feasible to provide a minimum contact.

The junctures of the two types of passages along the surface 109 can be made smooth, however, by the use of my improved type of surface because that surface is generated by radial straight line elements and the radial element of the surface of one type may be made to coincide with the radial element of the surface of the other type along the separating surface 109, as pointed out below. Furthermore, because of the nature of the surfaces quite different surfaces may be used for the two portions of the gas cooling passage without any very perceptible kink in the flow of gas at the junction point. In fact, given any two surfaces of my improved type, it is possible to find radial straight line elements at which the skew angles of both surfaces are the same throughout the radial element. If junction is made along such straight line elements there will theoretically be no sharp deviation of the flow lines. These points will be made clearer in the theoretical discussion which follows.

Figure 9:
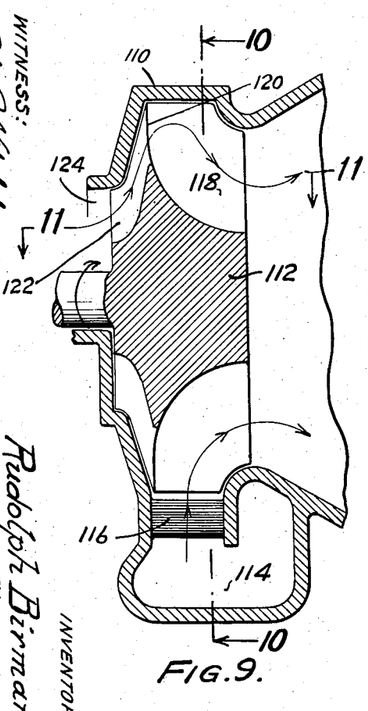
Figure 9 is an axial section of a turbine construction in which the driving gas passages form a portion of the passages for cooling gas, the cooling gas and driving gas being delivered to the rotor over different portions of the periphery of the turbine.
Figures 10, 11:
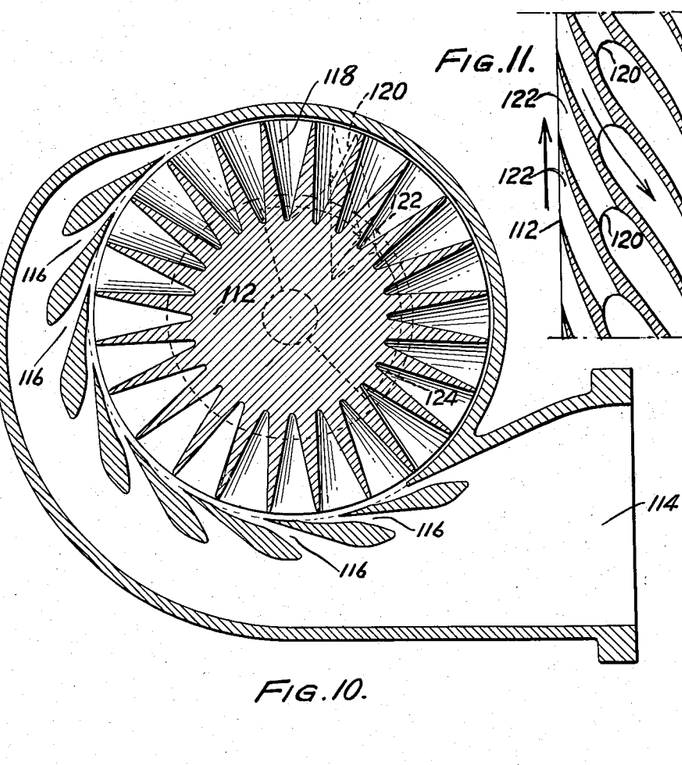
Figure 10 is a section of the same construction taken transverse to the axis on the plane the trace of which is indicated at 10—10 in Figure 9.
Figure 11 is a developed section taken on the surface the trace of which is indicated at 11—11 in Figure 9.

In Figures 9, 10 and 11 there is illustrated a further modification of the invention in which cooling of the rotor is effected by the flow of cooling air through passages made up in part by at least portions of the turbine buckets. In the construction of these figures the casing 110 houses a rotor 112 which is driven by gases entering a gas chest 114 from which they are directed by expanding nozzles 116 into the turbine buckets 118. The nozzles 116, however, do not introduce the driving gas throughout the entire periphery of the rotor chamber, but only through a portion thereof as illustrated in Figure 10. The turbine buckets 118 are provided at their upper left hand portions as viewed in Figure 9 with openings 120 with which communicate cooling air impeller passages 122, which passages are arranged to receive the cooling air over the peripheral extent of the construction in which the driving gases do not enter. As a consequence of this arrangement, each bucket receives driving gases through a portion of its rotation and cooling air through the remainder with the result that the average temperature of the blading is kept low.

The construction is such, as illustrated, that the impeller passages 122 do not substantially interfere with the proper flow of the driving gases. As in the previous modifications the impeller portions 122 of the cooling air passages compress the cooling air, which then enters the expanding portions of its passages constituted in this case by the turbine buckets. By a suitable design of the impeller passages 122, the construction of the buckets 118 may be made to effect the proper transformation of the energy of the cooling gases into mechanical energy serving to assist in the driving of the rotor.

As indicated heretofore, the radially extending surfaces of the various gas flow passages are preferably of the type described in detail in my Patent 1,959,703. These surfaces conform substantially as indicated in that patent to a surface expressible in cylindrical coordinates by the equation $x = K \tan b$, in which $x$ and $b$ are measured along and about the axis of rotation respectively. The constant K determines the curvature of the surface and affords a factor which provides freedom for design in accordance with the conditions under which the surface is used. In the case of an impeller, the surface is so arranged that the gas enters in a direction corresponding to the positive direction of $x$, flowing generally along straight line elements of the surface to the outlet; that is, the origin is somewhere outside the entrance. In the case of a turbine bucket, the surface is so arranged that the gas flows inwardly and emerges in the negative direction of $x$; that is, the origin is somewhere outside the exit. It will be clear, therefore, that in the case of the cooling gas passages of the type herein shown and described, as for example in Figure 2, the complete surface on which the passage is constructed comprises two similar surfaces (having the same K) of the type referred to located back to back and joining along corresponding radial elements on a line, for example, as indicated at $a$ in Figure 2. That is, as viewed in Figure 2, the impeller surface to the left of $a$ has its origin to its left, while the nozzle surface to the right of $a$ has its origin to its right. If at $a$, corresponding elements of the two surfaces (i. e. at the same $x$ values) join, there will be no break and smooth flow will occur. The cooling medium expansion passage 72 and the bucket passage 66 may be based on the same surface, giving uniform separating wall structure.

The surfaces defined by the above equation are generally not precisely useable in practice. If they were used as the opposite sides of a vane, for example, the vane would be thicker at its outside edge than at the hub. Consequently, the theoretical surface is adopted as the surface on which the actual vane and the passage are substantially built up and the gas flow in the resulting passage may be regarded as taking place smoothly along substantially such theoretical surface. Additionally, as in the present case, it is frequently necessary to provide inner and outer bounding walls with variable spacing between them at different points to define passages with proper cross-section variations. Such inner and outer bounding walls desirably merge smoothly with the vane walls for reasons of both mechanical strength and smooth flow, so that small radial cross-sections of passages may be oval rather than as they would be theoretically, namely, bounded by radial straight lines and circular outer and inner arcs. The entrance and exit lips of the vanes are also desirably streamlined to avoid excessive impact and turbulence thereat. Such variations, however, do not vitiate the advantages of the theoretical surfaces and the passages may be regarded as bounded in part by outwardly extending walls substantially conforming to the theoretical surfaces.

Figures 12, 13, 14:
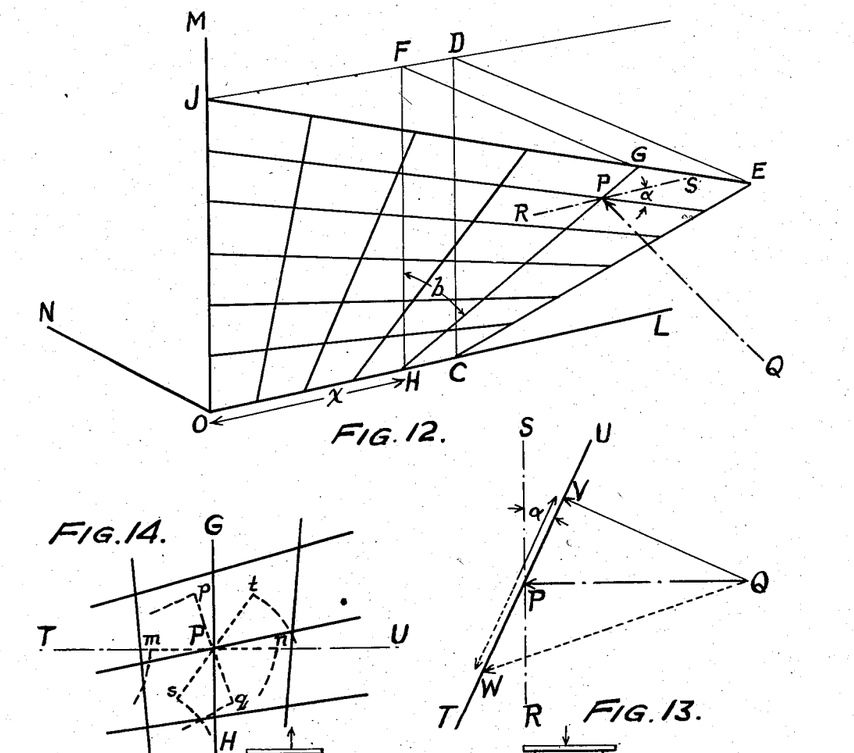
Figure 12 is a perspective diagram illustrating the construction and certain properties of the type of surface preferably used for the gas passages of my improved constructions.
Figures 13 and 14 are diagrams further illustrative of properties of my improved type of surface and particularly of the design of the inlet portions of turbine buckets based on that surface.

To clarify some novel points in connection with the improved type of surface, there is in Figure 12 a diagrammatic representation of the surface somewhat similar to Figure 8 of the said patent and having parts corresponding to said figure of the patent designated by the same reference characters, so that the disclosure of said patent may be read directly on the figure of this application. As pointed out in the patent, if OL is the axis of rotation, OM is a line perpendicular to said axis indicating the origin of reference for the surface as expressed in the formula given above, $x$ being measured in the direction of OL from the point O and the angle $b$ being measured opposite the direction of rotation from the plane defined by MOL in the case of an impeller surface and in its direction in the case of a bucket surface, and if JD is parallel to OL and JE is perpendicular to OM and at a certain angle DJE with respect to DJ, the surface may be regarded as generated by the motion of a line starting from the position OJ, the line always intersecting both OL and JE and being always perpendicular to OL. As pointed out in my said patent, the same surface is generated by causing a straight line to constantly intersect both JO and EC, which is perpendicular to OL, while remaining constantly perpendicular to JO. The surface accordingly is a doubly ruled one containing these two sets of straight lines members of which sets are illustrated in Figure 12. As pointed out in my patent, the straight lines of the set perpendicular to JO are particularly useful in the design of impeller and turbine bucket passages, providing outward flow of gas in the former and inward flow in the latter without substantial change of direction in the passages and without impact at the entrances to and exits from such passages. The impellers illustrated in the present case are preferably formed on the basis of the design outlined in said patent, namely, their walls substantially conform to the theoretical surface so defined differing therefrom to the extent imposed by mechanical considerations as outlined above.

The theoretical surface is very well adapted for turbines and for the provision of other gas passages such as the cooling passages, even though in these cases flow cannot be very well entirely confined to directions along the straight line elements of the surface. The doubly ruled condition of the surface, however, inherently implies an approximation of all small areas thereof to planes with smooth deviations generally providing about the shortest practical paths between points. Furthermore, the consistent approach of small areas to planes makes it possible to so design inlet and outlet portions of passages in such fashions as to avoid to a maximum extent any sharp changes of direction of flow which would result in impact losses and turbulence. As pointed out in my patent, furthermore, exit and entrance angles so vary along radial extents of this type of surface as to conform substantially exactly to the desired variations. From all of these standpoints, therefore, the surface is an ideal one as a basis for design to meet various conditions even though precise straight line flow is not practically achievable.

As pointed out in my Patent 1,959,703, the skew angle $n$ of any point of one of my improved surfaces is given by:

$$\tan n = \frac{K \sec^2 b}{r}$$

For a surface having a different constant $K'$, the skew angle $n'$ is given by:

$$\tan n' = \frac{K' \sec^2 b'}{r}$$

Obviously if portions of these two surfaces are joined along a proper radial element either with both portions extending in the same direction as in an impeller passage or in a turbine passage, or back to back as in a cooling gas passage, there will be no difference of skew angle anywhere along the radial element if $K \sec^2 b$ is made equal to $K' \sec^2 b'$ which is aways possible by a proper relative difference in origin positions of angle $b' \pm b$. Thus it is possible not only to match two surfaces along a radial line but to match them in slope along such line, so there may be provided a continuous perfectly smooth passage, such as the cooling air passages of Figure 6, by a choice of any two surfaces having different or the same constants K dictated by requirements provided they are joined correspondingly or back to back on corresponding radial elements. The surfaces are such, however, that the elements along which joining takes place may differ considerably from corresponding ones while still securing smooth flow, the junction portions being caused to deviate slightly from the theoretical by slight smoothing of any angle which results from basis on the theoretical surfaces.

I have, furthermore, discovered that the use of my improved surfaces in conjunction with a suitable choice of direction of the entrance lips of turbine buckets bounded by my surfaces results in a posibility of securing another element of freedom in the way of design of a turbine. It frequently happens that one factor, for example, the operating conditions of an engine supplying exhaust gases for driving a turbine, may impose a certain optimum spouting velocity for the gases delivered to the turbine, while, on the other hand, some other factor, for example, the proper speed of a generator driven by the turbine or the proper speed of an impeller driven by the turbine may impose an apparently inconsistent requirement on the speed of the turbine rotor.

By the use of my improved surface and the choice of a proper direction of inlet lip for the turbine bucket, I am able to so design a turbine rotor as to correlate these two conditions which are frequently so divergent in their requirements that they cannot be satisfactorily correlated by the use of conventional forms of buckets. The ability to accomplish this end results from certain features of the geometry of my improved surface, as will be evident from the following discussion.

Referring to Figure 12, a point P is illustrated on the surface JECO, which point lies upon a radial straight line element of that surface, indicated at GH. If this surface is regarded as the basic surface on which a turbine bucket wall is constructed, a line QP perpendicular to the radial element HG and lying in the plane of FGH will be tangential to the direction of rotation and may be taken to represent vectorially the peripheral velocity of the rotor at the entrance to a bucket. While this vector QP is perpendicular to the radial element GH, it is not perpendicular to the ruled surface and a line RS which is mutually perpendicular to GH and QP will make some angle such as $\alpha$ with the ruled surface in such fashion that, as viewed in Figure 12, the right hand end of this line would lie behind the surface and the left hand end in front of the surface. Though it so appears approximately in Figure 12, the straight line element of the ruled surface through P other than GH does not form with the line RS the angle $\alpha$, though this condition may be closely approximated if the skewed condition of the surface at the point considered is not too great.

Referring now to Figure 13, this figure represents a section taken on the plane defined by QP and RS. Their mutual perpendicular GH is now perpendicular to the plane of the paper at P. The section of the surface by this plane adjacent P will approximate a straight line TU making the angle $\alpha$ with RS.

Assuming QP to be the vectorial representation of the peripheral velocity of the point P, and QV the vectorial representation of the spouting velocity of gases fed to a bucket the entrance lip of which is located at P, the relative velocity of the gases with respect to the bucket surfaces at the point P will be represented by the vector PV and the relative flow would be in a right hand direction as viewed in Figure 13. It may be noted at this point that in order to cause the gases to clear the bucket lips and so enter a bucket, the gases cannot possibly be directed in the direction of peripheral rotation, but must be directed at a relatively small angle relative thereto, which angle is represented by PQV.

On the other hand, if QW is taken to represent the vectorial spouting velocity of gases entering at P the relative velocity along the surface would be that indicated at PW in a direction toward the left in Figure 13.

The two conditions mentioned above represent the extremes which may exist. As outlined above, the peripheral velocity QP may be established by certain conditions and the spouting velocity by other conditions. If the spouting velocity is as small relative to the peripheral velocity as is QV relative to QP, then the gas should be made to enter toward the right as indicated in Figure 12, with the spouting direction lying in a plane perpendicular to the radial element GH. On the other hand, if the spouting velocity exceeds the peripheral velocity to the relative extent indicated by QW with respect to QP, then the flow should be toward the left in Figure 12 and in a plane which is perpendicular to the radial element GH. These are the limiting relationships of spouting velocity and peripheral velocity possible with an angle as indicated. Between these two limits, however, any other ratio may exist and may be taken care of in such fashion as to cause the gas to enter the bucket without impact, merely by causing the entrance to take place from outside the element TU of the surface in a proper direction. Given, for example, some certain angle between the spouting direction and the direction of peripheral movement such as the angle VQP, which in Figure 13 is the same as angle PQW, the other angles of approach could be defined by vectors extending to a plane perpendicular to the paper through UT at the intersection of such plane with a cone generated about QP as axis and having as half its vertex angle at Q the angle VQP. In all such cases, of course, for practical purposes the gas must enter in a direction toward the radius so that in the vectorial representation of Figure 13 the points of this intersection of the cone and plane which would be available would lie toward the axis with respect to TU.

The various conditions encountered will be made clearer by consideration of three alternatives indicated in Figure 14, which represents a view of the bucket surface in the direction of QP so that the vector QP is now perpendicular to the plane of the paper. A small portion of the surface at this point will be approximately a plane warped out of the plane of the paper, but having an element TU which in the projection of Figure 14 will appear perpendicular to the radial element GH. If the peripheral velocity and the spouting velocity of the gas are such that the peripheral velocity is equal to the spouting velocity times the cosine of the angle between them, the lip of the bucket should be along the surface in such direction that its trace in Figure 14 would lie along the trace of the line TU as indicated at $mn$. Dotted line $mn$ represents the lip of a proper bucket for this condition, and the immediately adjacent portions of the passage which will extend inwardly and toward the left to the discharge are indicated in the small extensions at the points $m$ and $n$. In such case, the gases will enter the bucket without impact and will undergo smooth flow to the exit.

On the other hand, if the gases are moving relative to the peripheral velocity at a speed greater than that defined, the bucket entrance would be that indicated at $pq$ and the bucket passage would extend downwardly toward the left to the discharge as indicated by the extensions at the ends of the lines $pq$. By the choice of a proper angle of $pq$, as will be evident from the description of Figure 13, the gases will, in this case, as in the former case, pass into the bucket passages without impact and will be smoothly guided toward the discharge with such incidental transformation on the way as will result from the variation in cross-section of the path of flow.

The third case to be considered is that in which the spouting velocity is related to the peripheral velocity in a fashion less than that mentioned above. In this case, the bucket lip will be as indicated at $st$ and the passage will extend first toward the right and then curve downwardly toward the left as indicated by the extensions at the ends of the line $st$. Here again, smooth entrance without impact is provided.

It should be noted that the lines $mn$, $pq$ and $st$ represent virtual rather than necessarily actual lips for the buckets. In other words, these lines represent the traces of planes perpendicular to the direction of flow of the gases relative to the bucket passages. By a suitable design of the cooperating nozzles the actual metallic lips of the buckets may, of course, have relations to the virtual lips other than coincidence.

By the above considerations it will be seen that my improved surface taken in conjunction with the proper design of the virtual lips of the buckets affords a substantial freedom of choice in the relative velocities of the gases and the bucket lips while still maintaining impactless entrance and smooth flow. The sole limitation is the angle α which if insufficient may be increased by a choice of a different surface as determined by the constant K or by entrance at a different point on any given surface.

The conditions required may be summarized by stating that the position of the virtual lip of a bucket with respect to the radial elements of my surface is such as to be perpendicular to the vector representing the relative velocity of the driving gases resulting from the peripheral velocity and the spouting (absolute) velocity of the gases under rated conditions, the said relative velocity vector being tangent to the surface at the position of the virtual lip. By "rated conditions" there are meant the conditions of operation for which the mechanism is designed and under which its performance is most satisfactory.

One advantage of this possibility of choice of the location of the virtual lip of the turbine bucket is that the turbine buckets may be based on the same theoretical surfaces as intermediate cooling passages, as in the designs of Figures 1, 2 and 5. As a result of this, uniformity of separating wall structure becomes possible with the attendant increase in mechanical strength, and discharges from both the turbine buckets and cooling passages take place in the same direction. This arrangement is also advantageous from a thermodynamical viewpoint where, as in the modification of Figures 9 to 11, inclusive the turbine bucket forms a portion of the cooling gas passage. While in Figure 9 the lip of the turbine bucket is indicated, in its projection, as substantially parallel to the axis of rotation, this lip may be set at various angles as indicated in Figure 14 to take care of various relationships between the spouting velocity of the driving gases and the peripheral speed of the rotor, while at the same time making it possible to use the same theoretical surfaces as the basis for the design of the walls of the impeller portion of the air passage and the turbine buckets forming the expanding portion thereof. In Figure 1 the lips of the turbine buckets are formed as indicated at $pq$ in Figure 14, thus making it possible to utilize the same theoretical surfaces for both the turbine and air passage walls. In the modifications of Figures 2 and 5, the same end is achieved, but in these cases it is indicated as possible to utilize entrance lips substantially parallel, in their projections, to the axis of rotation.

As indicated in the statement of the objects of the invention, one object is to so cool a turbine rotor by the passage of gas therethrough as to recover in the useful forms of either pressure energy or mechanical energy (usually the latter) a maximum amount of heat energy imparted to the cooling gas, which heat energy would ordinarily be wasted. In the case of the recovery of mechanical energy, it is desirable to recover also in that form any pressure and kinetic energy imparted to the cooling gas in causing it to flow through the cooling passages. The recovery of these energies in the form of pressure or in the form of mechanical energy represents substantially a single problem from the standpoint of the theory applicable, a maximum amount of either form of energy or some desired proportion of both forms being secured merely by a suitable variation in the arrangement of the cooling passages. The same considerations apply more broadly but for simplicity of description the underlying principles will be first described with reference to Figures 15 and 16 in the former of which there is diagrammatically indicated a cross-section of a cooling passage taken along radial lines passing through its center line and Figure 16 represents variations of various conditions of the cooling gases plotted against those passage locations represented in Figure 15 located directly thereabove.

Generally speaking, the cooling passage, as will be evident from the structural descriptions heretofore given, comprises a portion of progressively increasing distances from the axis of rotation extending from the entrance 200 to a portion 202 desirably located adjacent the periphery of the rotor or at least adjacent the outermost portions of the turbine buckets. From this portion 202 the passage continues either at approximately the same radial distance from the axis of rotation or inwardly toward that axis to a greater or less extent to the discharge 204. While, as pointed out hereafter, it is preferable for various reasons to utilize my improved blade surface or a combination of such surfaces to form the bounding wall of this passage, the advantages of such surface are rather the minimizing of friction and the more ready attainment of simple and proper mechanical structure and inlet and discharge conditions than the securing of results of thermodynamic significance from the standpoint of occurrences through the passages. The aspects of the invention now under discussion, therefore, are applicable to passages of various forms of bounding walls, so long as such passages are smooth so as to satisfy the requirements of good design. Variation of cross-section, which is of importance, may, of course, be obtained in many ways merely by varying the clearances about the center line of a passage, and hence in speaking of variations of cross-sectional area, it is not meant to imply that the mode in which the variation is accomplished is of thermodynamic importance. In the case of my improved form of blading, however, inasmuch as the blade surfaces are well defined it is desirable to secure variations in cross-sectional area primarily by varying the radial extents of the passages.

It is not essential that the impeller portions of the cooling gas passages extend outwardly though this is usually desirable. The attainment of the objects of the invention may be achieved by using passages having substantially constant spacing from the axis in which cases energy imparted by rotation of the rotor appears as kinetic energy in the gas.

Figures 15, 16:
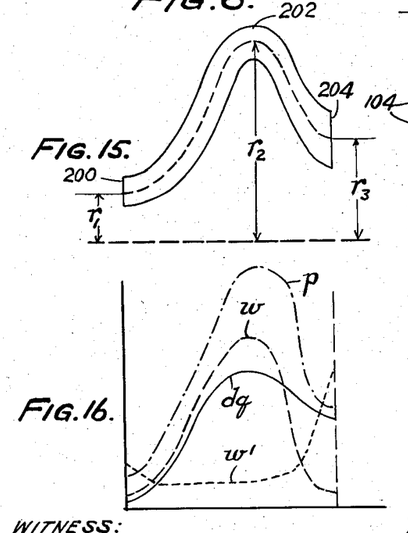
Figures 15 and 16 are diagrams jointly illustrating the design of flow passages for cooling gas so as to recover transformed energy in desired form.

Generally speaking, the portions of the cooling passage indicated in Figure 15 determine the following conditions of the flowing gas. The gas approaching 200 from the supply passages has only what might be designated a pipe velocity of approach so that its kinetic energy is quite low. As it is scooped into the portion of the passage extending from 200 to 202 it is compressed as in an ordinary centrifugal compressor and attains an absolute value of velocity $w$ corresponding to the resultant of its velocity relative to the walls of the passage and the peripheral velocity of the passage. Along this passage to the point 202 heat is absorbed from the passage walls, the construction as illustrated in figures previously discussed generally providing an increase in the rate of addition of heat as the point 202 is reached, though the maximum rate of addition of heat may occur even beyond this point. The rate of addition of heat, of course, depends not only on the proximity to the buckets and the highest temperature portions thereof, but also upon the temperature difference between the bucket walls and the cooling gases, which difference decreases as the temperature of the gases rises. At the point 202 representing the maximum radial distance $r_2$ from the axis of rotation the kinetic energy of the gases will in general have reached or be approximately the maximum. At this point not only will the absolute velocity of the gas have a maximum component due to maximum distance from the axis of rotation, but will also have a comparatively large component of velocity relative to the passage walls due to the expansion occurring because of the rise in temperature.

If we neglected the continued addition of heat beyond the point 202 (though in reality this addition is taken into account and adds to the energy of the gases) the gases at this time would have acquired their maximum total energy. The remaining portion of the passage 202 to 204 would, therefore, be devoted to transforming the kinetic, heat and pressure energy of the gases at the point 202 to the desired form.

At this point, therefore, two extreme conditions of transformation might be ultimately secured as well as any intermediate conditions between these. The first is the attainment of a maximum pressure at the outlet which may be the desirable result if the cooling gas is to be recovered under maximum pressure for some useful purpose. Furthermore, the gas should have as little as possible residual kinetic energy which means that immediately after discharge it should have only the low pipe velocity necessary to carry it away. Alternatively, if it is discharged with a relatively high residual kinetic energy stationary diffuser passages may be provided to transform this residual kinetic energy into pressure.

The other most useful alternative is the utilization of the energy of the cooling gases to perform mechanical work directly upon the rotor. Under such circumstances, the energy should be transformed to a maximum extent to appear as torque working in the direction of rotation of the rotor. This means that discharge should be effected as far from the axis of rotation as possible. Again, at the discharge the gases should have the lowest possible temperature and should have a minimum of kinetic energy.

The only instance in which discharge with high kinetic energy is desirable is in case the kinetic energy is to be used for the driving of another turbine wheel. This is the case, for example, when the peripheral velocity of a rotor because of the limitations of mechanical strength cannot be made sufficiently high to effect the ideal result of securing minimum absolute leaving velocity. In such a case it is necessary to resort to multistaging in order to obtain the maximum efficiency or the maximum possible yield of mechanical energy. Multistaging in such case involves using a first stage of the type herein described together with one or several additional sets of stationary guide vanes for redirecting the discharge gases, and blading, preferably of the conventional type for conversion of their remaining energy into torque.

It may be noted that since the cooling and driving gases are intermingled, the temperature of the mixture will be sufficiently low to be handled by the types of blading well known in steam turbine practice. In other words, only the first stage need be of the type herein described provided with cooling gas passages.

Figure 16 illustrates the type of passage which might be regarded as recovering the energy of the gases in a combination of the two forms of pressure and mechanical energy. It will be noted that the discharge 204 is now at a radius $r_3$ intermediate the inlet radius $r_1$ and the maximum radius $r_2$. The portion of the passage between 202 and 204 must be generally designed so as to bring about a transformation of the heat and kinetic energy into pressure, or, if so desired, to transform a part, or all possible of the heat and pressure energy into kinetic energy. In all cases the accompanying relative velocity of the gas with respect to the passage at the point of discharge 204 is such that the gas is moving peripherally at a speed relative to the rotor in a backward direction such that its absolute rotational velocity is substantially negligible. At the same time its temperature should be as low as is consistent with its change of state representing a maximum transformation of its heat energy into mechanical and/or pressure energy. In other words, after leaving the wheel its velocity should be at a low rate in an axial direction sufficient only to carry the gas away at a rate depending upon the final pressure and temperature and the rate of supply. Of course, this condition is generally only achievable at some particular rated conditions for which the design is made, deviations from such conditions resulting in more or less absolute rotational discharge velocity component in either a forward or rearward direction, though generally substantial deviations from rated conditions do not detract greatly from the efficiency of the arrangement.

If it is desired to obtain the maximum recovery of mechanical energy the end 204 of the passage will be at the maximum distance from the axis of rotation consistent with the attainment of the necessary cross-section at the exit, which cross-section results from the proper design of the nozzle portion of the passage. At the same time, the discharge should be at as small a backward angle with respect to the peripheral velocity as possible, so that the maximum torque is obtained consistent with any controlling factors of efficiency.

It may be remarked that, since waste gases are generally being used in supercharging arrangements, maximum efficiency from the thermodynamic standpoint may not be the major consideration in design, delivery of air at proper temperature in proper amounts consistent with small size of the supercharging unit, or similar factors entering into consideration.

The requirement that the peripheral component of absolute discharge velocity of the gases should be zero necessitates at this large radius that the gases should be given a quite high relative velocity with respect to the passage walls. In the case of my improved type of passage surface, it will be observed (from Figure 12 and the expression given above for the skew angle) that a small angle of discharge is an accompanying consequence of the location of the discharge at a maximum distance from the axis of rotation. Though usually it is feasible to use a single guiding surface of my improved type, other considerations may require that to secure the minimum outlet angle the discharge portions of the passages should be formed on the basis of a surface other than that forming the basis of the intake portions. The question of satisfactory junction of surfaces is discussed above.

If it is desired to secure a maximum pressure of the gases with relatively little regard for the mechanical energy which is recovered the discharge 204 would preferably be at approximately the same radius as the inlet radius, though as a matter of fact, it may be at even a smaller radius. In explanation of the latter statement, and inasmuch as on first glance there might appear to be a balance of centrifugal action, it may be pointed out that the specific density of the gases in the intake leg of the U-shaped passage is greater than the specific density in the discharge leg due to the fact that the temperature in the latter is very much higher than in the former. As a consequence, at the high speeds at which the rotor operates a discharge pressure can be obtained which may be very much higher than the intake pressure despite the fact that the discharge may be at a less distance from the axis of rotation than the inlet.

One feature of operation may be here noted, namely, the very considerable ejector effect resulting from imparting a relatively high leaving velocity to either the driving gases or the cooling air when an arrangement is used such as in Figure 3, in which the air passages are interspersed with the driving gas passages. If a relatively high absolute leaving velocity is imparted to the cooling air the ejector effect on the driving gases reduces their terminal pressure thereby increasing the power output obtainable or reducing the initial pressure of the driving gases necessary to obtain a given power output. This ejector effect, of course, tends to reduce the velocity of the cooling air and again maximum efficiency is attainable when the final absolute velocities of the commingled gas and air are minimum. Desirably in design this is taken into account, since, just as in the well known case of steam turbines, the power output is very much increased with decrease of pressure on the exhausted driving fluid. If the leaving velocity of the driving gases is higher than that of the cooling air, for example, if the cooling air is not precompressed, there occurs an ejector effect on the cooling air.

In order to give a descriptive picture of the type of conditions encountered, Figure 16 is used to illustrate the variations of factors entering into the well known equations used in design of an arrangement such as that of Figure 15. In this figure, there are illustrated typical variations of $dq$, the rate of addition of heat along the passage, $w$, the absolute velocity of the gas and $p$, the pressure of the gas. Additionally, there is indicated by the curve $w'$ the variation of relative velocity of the gas with respect to the passage walls.

Figure 17:
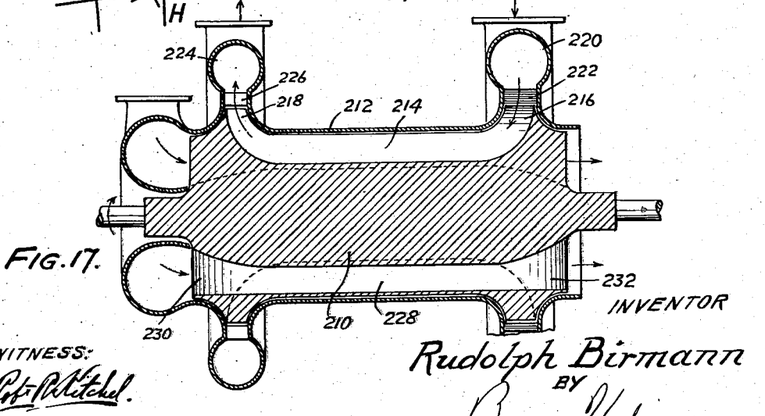
Figure 17 is a diagrammatic axial section of a rotor of a turbine adapted to operate on hot waste gases at low generally unusable pressures.

As a further example of the application of the principles of this invention in a device quite substantially different from those heretofore discussed, reference may be made to Figure 17, which illustrates a rotary device adapted to convert waste heat of exhaust gases at little or no gauge pressure into mechanical energy. Hot gases at low pressure are of substantially no use except for purely heating purposes, but in accordance with my invention may be caused to provide directly mechanical energy.

A rotor 210 is surrounded by a housing 212 and is provided with alternate longitudinally extending driving gas passages 214 and cooling air passages 228. The former passages are provided at their inlet ends with turbine portions 216 and at their outlet ends with impeller portions 218. Hot gases enter the turbine portions of the passages from a chest 220 through suitable nozzles 222 adapted to impart high velocity to the gases. At the outlet impeller ends of the passages discharge is effected into diffuser passages 226, thence into an annular receiving passage 224, which may communicate with the atmosphere.

The cooling air passages 228 are provided with inlet impeller portions 230 opening in the direction of rotation so as to scoop into the passages air at atmospheric or higher pressure. This air is axially accelerated through the passage and is discharged at turbine portions 232 of the passages opening in a direction opposite the direction of rotation and so formed as nozzles as to accelerate the heated air with a drop of temperature so that it is discharged under conditions imparting a maximum torque to the rotor. The air may be supplied from the atmosphere or under pressure, preferably the latter if some compressed air is available.

If the hot gases supplied to the chest 220 have a pressure slightly greater than the discharge pressure in the passage 224, the slight existing pressure of the gases may be sufficient to start the rotor. If not, however, the rotor must be started by connection to an electrical motor or the like. Assuming, however, it is brought up to its proper speed in either fashion, and assuming that the entering hot gas has little or no pressure above atmospheric, the action is as follows:

The impeller portions 218 of the gas passages create a partial vacuum in the passages so that a substantial pressure drop will occur providing a high velocity of entrance of the gases into the turbine portions 216 of the gas passages. The effect of the cooling air flowing axially through the air passages cools the gases through the intermediate portions of their passages with the result that substantially cooled gases reach the impellers 218 wherein these cooled gases are compressed and discharged through the diffuser 226 to atmospheric pressure. Considering only what occurs in the gas passages, it will be seen that mechanical work can be imparted to the rotor solely by reason of the fact that there is less work involved in compressing the cool gases to atmospheric pressure than is given up in the turbine portions of the passages by the transformation of these gases in hot condition from atmospheric pressure or thereabouts to the pressure of the impeller inlets. At the same time, a similar action, but in a somewhat reversed order, is taking place in the cooling air passages. The cooling air which enters is accelerated along the axial passages, heated therein and then discharged at a temperature substantially less than the temperature of the hot gases where they are received in the other passages and under such conditions as to transform the heat energy into mechanical energy of rotation. Here, also, there is a net gain of mechanical energy. The counterflow condition existing between the gas and the air provides an approximately constant temperature gradient throughout the entire length of the adjacent portions of the passages. Though the apparatus is relatively inefficient, it represents a possibility of utilizing in accordance with the principles of the invention the heat energy of gases otherwise of substantially no mechanical use.

The principles of the invention may be otherwise embodied, particularly in the multistaging of centrifugal compressors wherein compression may be effected in any fashion by centrifugal action followed by heating, then partially expanding to secure a net increase of pressure, cooling, and recovering the energy of cooling gases in the form of mechanical energy, and recompressing, heating and expanding. In such cases, the heat of waste gases under little or no pressure can be utilized in a fashion similar to that illustrated in Figure 17.

From the above descriptions of various embodiments of the inventive features described herein, it will be clear that the basic inventions are applicable in quite general fashions subject to relatively slight departures from theoretically optimum thermodynamic conditions, depending upon mechanical and other considerations to be fulfilled. Accordingly, in the following claims where reference is made to the attainment of certain particular conditions, it will be understood that within the scopes of such claims are arrangements in which relatively slight departures from such conditions are made for the purpose of satisfying somewhat inconsistent requirements.

What I claim and desire to protect by Letters Patent is:

1. An elastic fluid mechanism including a rotor mounted for rotation about an axis, turbine passages in said rotor, means for directing hot driving fluid into the turbine passages, and passages located between the turbine passages for elastic cooling fluid having intake and discharge portions, the intake portion of each cooling fluid passage being formed as an impeller to receive and compress cooling fluid, and the discharge portion of each cooling fluid passage being formed to discharge the cooling fluid rearwardly to impart power to the rotor by reaction, said cooling fluid receiving from the rotor in its passages heat imparted to the rotor by the driving fluid, said cooling fluid passages being bounded in part by outwardly extending walls each of which substantially conforms to a surface expressible in cylindrical coordinates by the equation $x = K \tan b$, in which $x$ and $b$ are measured along and about the axis respectively.

2. An elastic fluid mechanism including a rotor mounted for rotation about an axis, turbine passages in said rotor, means for directing hot driving fluid into the turbine passages, and passages located between the turbine passages for elastic cooling fluid having intake and discharge portions, the intake portion of each cooling fluid passage being formed as an impeller to receive and compress cooling fluid, and the discharge portion of each cooling fluid passage being formed to discharge the cooling fluid rearwardly to impart power to the rotor by reaction, said cooling fluid receiving from the rotor in its passages heat imparted to the rotor by the driving fluid, adjacent portions of the turbine and cooling fluid passages being bounded in part by outwardly extending walls each of which substantially conforms to a surface expressible in cylindrical coordinates by the equation $x = K \tan b$, in which $x$ and $b$ are measured along and about the axis respectively.

3. An elastic fluid mechanism including a rotor mounted for rotation about an axis, turbine passages in the rotor, means for directing hot driving fluid into the turbine passages, the distance from the axis of the discharge ends o said passages being less than the mean distance from the axis of the intake ends of said passages, and passages located between the turbine passages for elastic cooling fluid, said turbine passages being bounded at least at their inlet ends by outwardly extending walls each of which substantially conforms to a surface expressible in cylindrical coordinates by the equation $x = K \tan b$, in which $x$ and $b$ are measured along and about the axis respectively, and each turbine passage having a virtual lip substantially perpendicular to the direction of the relative velocity of the driving gases resulting from the peripheral velocity of the lip and the spouting velocity of the entering driving gases under rated conditions, the driving gases entering the passages at such relative velocity substantially tangentially to said bounding walls.

4. An elastic fluid mechanism including a rotor mounted for rotation about an axis, turbine passages in said rotor, means for directing hot driving fluid into the turbine passages, and passages located between the turbine passages for elastic cooling fluid having intake and discharge portions, the discharge portion of each cooling fluid passage being formed to discharge the cooling fluid rearwardly at a high velocity relative to the rotor, and the discharge portions of the turbine and cooling fluid passages being located adjacent each other and separated at their outlets by thin walls of substantial radial extent, the adjacent discharging streams thereby having substantial flatwise contact so that one fluid may exert an ejector action on the other.

5. An elastic fluid mechanism including a rotor mounted for rotation about an axis and provided with passages for elastic fluid having intake and discharge portions and continuous between said portions, and means for adding substantial amounts of heat to the elastic fluid during its flow through said passages, the center line of each of such passages being at a distance from the axis of rotation in an intermediate portion thereof at least as great as at its intake and discharge portions, and each of such passages being arranged at its discharge portion to discharge the fluid backwardly relatively to the rotor to impart power to the rotor by reaction, said fluid passages being bounded in part by outwardly extending walls each of which substantially conforms to a surface expressible in cylindrical coordinates by the equation $x = K \tan b$, in which $x$ and $b$ are measured along and about the axis respectively.

6. An elastic fluid mechanism including a rotor mounted for rotation about an axis and provided with passages for elastic fluid having axially spaced intake and discharge portions and continuous between said portions, said passages extending spirally in the rotor substantially about its axis, as viewed in a radial direction, from their intake portions to their discharge portions, and the center line of each of such passages being at a distance from the axis of rotation in an intermediate portion thereof at least as great as at its intake and discharge portions, said rotor also being provided with turbine buckets, and means for directing hot elastic driving fluid to the turbine buckets to effect driving of the rotor and substantial heat transfer to elastic fluid during its flow through said passages, the transfer of substantial amounts of heat being confined to portions of each passage in which no substantial compression occurs, and each of such passages being arranged at its discharge portion to effect therein expansion of the fluid and to discharge it backwardly relatively to the rotor to impart power to the rotor by reaction.

7. An elastic fluid mechanism including a rotor mounted for rotation about an axis and provided with passages for elastic fluid having axially spaced intake and discharge portions and continuous between said portions, said passages extending spirally in the rotor substantially about its axis, as viewed in a radial direction, from their intake portions to their discharge portions, and the center line of each of such passages being at a distance from the axis of rotation in an intermediate portion thereof at least as great as at its intake and discharge portions, said rotor also being provided with turbine buckets, and means for directing hot elastic driving fluid to the turbine buckets and into said passages to effect driving of the rotor and substantially heat transfer from the heated passage walls to elastic fluid during its flow through said passages, the transfer of substantial amounts of heat being confined to portions of each passage in which no substantial compression occurs, and each of such passages being arranged at its discharge portion to discharge the fluids backwardly relatively to the rotor to impart power to the rotor by reaction.

8. An elastic fluid mechanism including a rotor mounted for rotation about an axis, and means for directing hot driving fluid to the rotor, said rotor being provided with passages for elastic cooling fluid having axially spaced intake and discharge portions and continuous between said portions, said passages extending spirally in the rotor substantially about its axis, as viewed in a radial direction, from their intake portions to their discharge portions, each passage extending at its intake portion in the direction of approach of cooling fluid to the rotor to scoop up and compress the cooling fluid and impart to it an axial component of flow, and each of such passages being arranged at its discharge portion to discharge the cooling fluid rearwardly, said compressed cooling fluid receiving from the rotor in said passages heat from the driving fluid.

9. An elastic fluid mechanism including a rotor mounted for rotation about an axis, turbine passages in said rotor, means for directing hot driving fluid into the turbine passages, and passages located adjacent the turbine passages for elastic cooling fluid having axially spaced intake and discharge portions and continuous between said portions, said passages extending spirally in the rotor substantially about its axis, as viewed in a radial direction, from their intake portions to their discharge portions, each passage extending at its intake portion in the direction of approach of cooling fluid to the rotor to scoop up and compress the cooling fluid and impart to it an axial component of flow, and each of such passages being arranged at its discharge portion to discharge the cooling fluid rearwardly, said compressed cooling fluid receiving from the rotor in said passages heat from the driving fluid.

10. An elastic fluid mechanism including a rotor mounted for rotation about an axis and provided with passages for elastic fluid having intake and discharge portions and continuous between said portions, and means for adding substantial amounts of heat to the elastic fluid during its flow through said passages, the center line of each of such passages being at a distance from the axis of rotation in an intermediate portion thereof at least as great as at its intake and discharge portions, and each of such passages being arranged at its discharge portion to discharge the fluid backwardly relatively to the rotor to impart power to the rotor by reaction, said fluid passages being bounded by walls causing the passages to extend substantially along straight lines bearing a skew relation to the axis of rotation.

11. An elastic fluid mechanism including a rotor mounted for rotation about an axis and provided with passages for elastic fluid having intake and discharge portions and continuous between said portions, and means for adding substantial amounts of heat to the elastic fluid during its flow through said passages, each of such passages being arranged at its discharge portion to discharge the fluid backwardly relatively to the rotor to impart power to the rotor by reaction, said fluid passages being bounded by walls causing the passages to extend substantially along straight lines bearing a skew relation to the axis of rotation.

12. An elastic fluid mechanism including a rotor mounted for rotation about an axis and provided with passages for elastic fluid having intake and discharge portions and continuous between said portions, and means for adding substantial amounts of heat to the elastic fluid during its flow through said passages, each of such passages being arranged at its discharge portion to discharge the fluid backwardly relatively to the rotor to impart power to the rotor by reaction, said fluid passages being bounded by walls causing the passages to extend substantially along straight lines bearing a skew relation to the axis of rotation, and all having similar radial projections upon any cylinder concentric with the axis of rotation.

13. An elastic fluid mechanism including a rotor mounted for rotation about an axis and provided with passages for elastic fluid having intake and discharge portions and continuous between said portions, and means for adding substantial amounts of heat to the elastic fluid during its flow through said passages, each of such passages being arranged at its discharge portion to discharge the fluid backwardly relatively to the rotor to impart power to the rotor by reaction, said fluid passages being bounded by walls causing the passages to extend spirally substantially along lines which, though differing for different radii for the radial extent of the passages, all have substantially similar radial projections upon any cylinder concentric with the axis of rotation.

14. An elastic fluid mechanism including a rotor mounted for rotation about an axis and provided with passages for elastic fluid having intake and discharge portions and continuous between said portions, and means for adding substantial amounts of heat to the passage walls to raise their temperature above that of the elastic fluid flowing through said passages thereby to effect transfer of heat to such fluid during its flow through the passages, the center line of each of such passages being at a greater distance from the axis of rotation in an intermediate portion thereof than at its intake and discharge portions.

15. An elastic fluid mechanism including a rotor mounted for rotation about an axis and provided with passages for elastic fluid having intake and discharge portions and continuous between said portions, said intake portions opening in the direction of rotation to receive the elastic fluid without shock, and means for adding substantial amounts of heat to the passage walls to raise their temperature above that of the elastic fluid flowing through said passages thereby to effect transfer of heat to such fluid during its flow through the passages, the center line of each of such passages being at a greater distance from the axis of rotation in an intermediate portion thereof than at its intake and discharge portions, and each of such passages being arranged at its discharge portion to effect expansion and discharge of the fluid under rated conditions backwardly relatively to the rotor without a substantial peripheral absolute velocity component thereby to impart power to the rotor by reaction.

16. An elastic fluid mechanism including a rotor mounted for rotation about an axis and provided with passages for elastic fluid having axially spaced intake and discharge portions and continuous between said portions, said passages extending spirally in the rotor substantially about its axis, as viewed in a radial direction, from their intake portions to their discharge portions, and the center line of each of such passages being at a distance from the axis of rotation in an intermediate portion thereof at least as great as at its intake and discharge portions, and means for adding substantial amounts of heat to the passage walls to raise their temperature above that of the elastic fluid flowing through said passages thereby to effect transfer of heat to such fluid during its flow through the passages, the addition of substantial amounts of heat being confined to portions of each passage in which no substantial compression occurs, and each of such passages being arranged at its discharge portion to effect therein expansion of fluid and to discharge it backwardly relatively to the rotor to impart power to the rotor by reaction.

17. An elastic fluid mechanism including a rotor mounted for rotation about an axis and provided with passages for elastic fluid having axially spaced intake and discharge portions and continuous between said portions, said passages extending spirally in the rotor substantially about its axis, as viewed in a radial direction, from their intake portions to their discharge portions, and the center line of each of such passages being at a distance from the axis of rotation in an intermediate portion thereof at least as great as at its intake and discharge portions, and means for adding substantial amounts of heat to the passage walls to raise their temperature above that of the elastic fluid flowing through said passages thereby to effect transfer of heat to such fluid during its flow through the passages, each of such passages being arranged at its discharge portion to effect expansion and discharge of the fluid under rated conditions backwardly relatively to the rotor without a substantial peripheral velocity component to impart power to the rotor by reaction.

18. An elastic fluid mechanism including a rotor mounted for rotation about an axis and provided with passages for elastic fluid having intake and discharge portions and continuous between said portions, and means for adding substantial amounts of heat to the elastic fluid during its flow through said passages, the center line of each of such passages being at a distance from the axis of rotation in an intermediate portion thereof at least as great as at its intake and discharge portions, and each of such passages being arranged at its discharge portion to discharge the fluid backwardly relatively to the rotor to impart power to the rotor by reaction, said fluid passages being bounded at their discharge portions by walls each of which substantially conforms to a surface having straight line elements extending in the direction of flow.

RUDOLPH BIRMANN.

CERTIFICATE OF CORRECTION.

Patent No. 2,283,176. May 19, 1942.

RUDOLPH BIRMANN.

It is hereby certified that error appears in the above numbered patent requiring correction as follows: In the grant, line 1, and in the heading to the printed specification, line 3, residence of inventor, for "Newton" read --Newtown--; page 11, first column, line 21, claim 7, for "substantially" read --substantial--; and that the said Letters Patent should be read with this correction therein that the same may conform to the record of the case in the Patent Office.

Signed and sealed this 21st day of July, A. D. 1942.

(Seal)

Henry Van Arsdale,
Acting Commissioner of Patents.